July 30, 1968 L. N. BATHISH ET AL 3,394,831
APPARATUS FOR STORING AND HANDLING PARENTERAL LIQUIDS AND
METHOD FOR OPENING SAME
Filed June 13, 1966 2 Sheets-Sheet 1
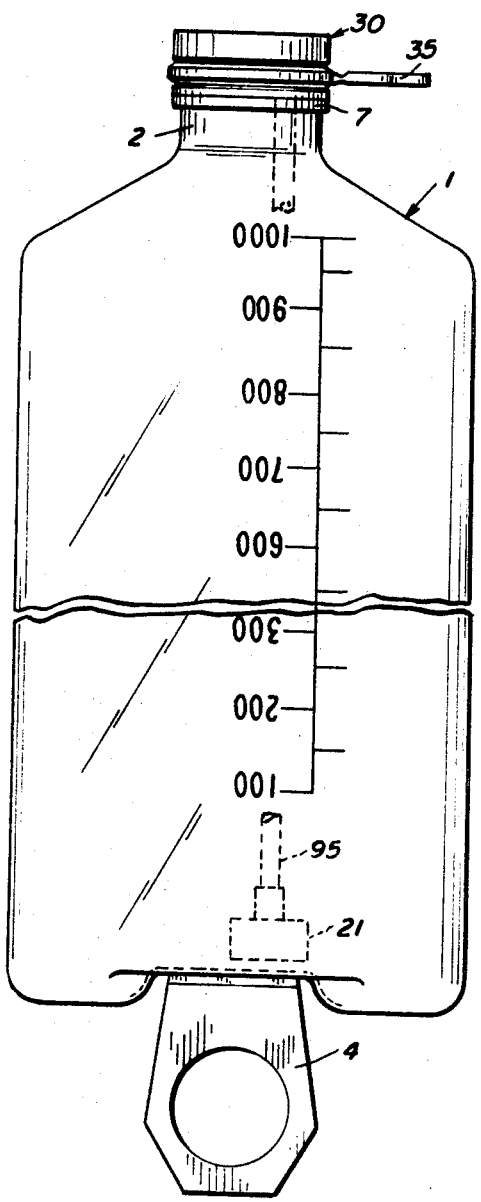
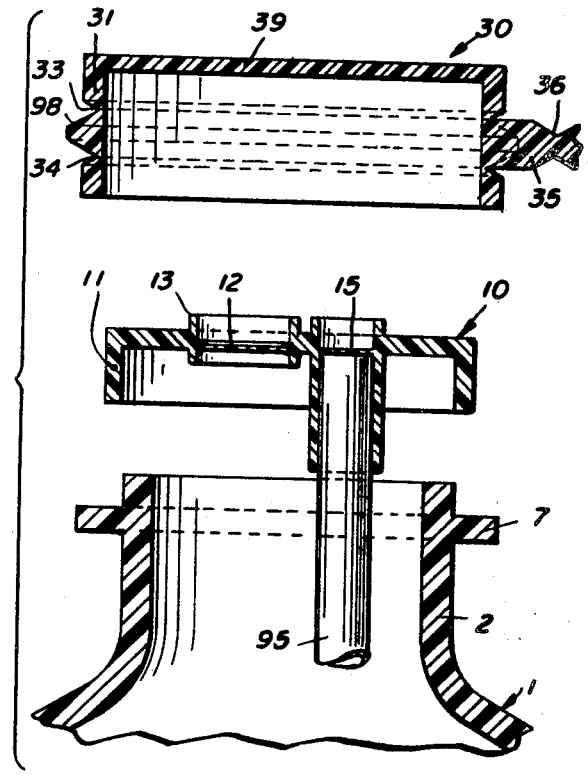
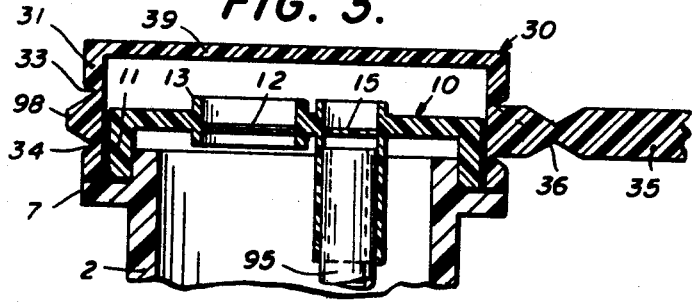
INVENTORS
LOUIS N. BATHISH
DAVID A. JELLIES
BY
Larry N. Barger
ATTORNEY

INVENTORS
LOUIS N. BATHISH
DAVID A. JELLIES
BY

*Larry N. Barger*

ATTORNEY

United States Patent Office 3,394,831
Patented July 30, 1968

3,394,831
APPARATUS FOR STORING AND HANDLING PARENTERAL LIQUIDS AND METHOD FOR OPENING SAME
Louis N. Bathish, La Crescenta, and David A. Jellies, Glendale, Calif., assignors, by mesne assignments, to American Hospital Supply Corporation, a corporation of Illinois
Filed June 13, 1966, Ser. No. 557,237
22 Claims. (Cl. 215—42)

ABSTRACT OF THE DISCLOSURE

A thermoplastic parenteral solution container with a tubular thermoplastic neck which has permanently bonded thereto both a thermoplastic inner closure with a pierceable non-resealable diaphragm and a thermoplastic outer cap which provides a bacteria-tight interiorly sterile protector for the inner closure. This thermoplastic outer closure permanently bonded to the thermoplastic neck has a pair of peripheral grooves defining a tear strip interrupted by a vertical groove next to a pull tab handle.

---

This invention relates to a unique thermoplastic closure system for a thermoplastic parenteral liquid container and to a method of opening this closure.

For years parenteral liquids such as normal saline, five percent dextrose in water, etc. have been supplied to hospitals in glass bottles. These glass bottles have many disadvantages. For one, the shipping cost of heavy glass bottles is considerable and it is expensive to dispose of these bottles or return them to the manufacturer. In addition, a glass bottle shatters when dropped, spreading dangerous glass chips in many directions.

Thermoplastic parenteral liquid containers have many advantages over glass. They are light in weight, easily disposable after use by burning in an incinerator and they take less space to store than bulky glass bottles.

One of the main problems holding back the use of thermoplastic containers for parenteral liquids has been the closure system. A closure system in a parenteral liquid container must satisfy certain requirements. It must be easy to open and provide a sterile portion for connecting an administration set. It must also keep the parenteral liquid within the container sterile over long storage periods. Because thermoplastic material tends to cold flow and change shape and dimension when under stress for a period of time, it is difficult to use a mechanical clamped-on closure to maintain sterility.

We have solved this problem by providing thermoplastic inner and outer closures, both of which are permanently bonded to the thermoplastic container. The outer closure sterily protecting the inner closure has a unique tear strip structure that is easy to open so an administration set can be connected to the inner closure. The inner closure is illustrated in two separate embodiments which are opened by unique methods when an administration set is attached.

Our invention can be better understood with reference to the attached drawings, in which:

FIGURE 1 is a side elevational view of the thermoplastic container and thermoplastic closure system;

FIGURE 2 is an exploded view in section of an upper portion of the thermoplastic container and closure system showing a first embodiment of the inner closure;

FIGURE 3 is a sectional view similar to FIGURE 2 but showing the thermoplastic container and thermoplastic closure system assembled and permanently bonded together;

Figure 4:
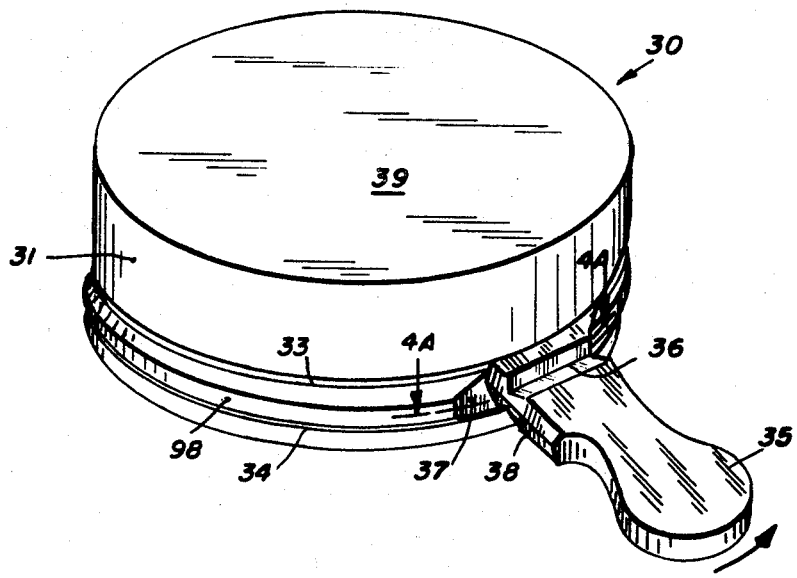
FIGURE 4 is a perspective view of the outer closure.

Turning now to the drawings, FIGURE 1 shows the thermoplastic parenteral liquid container 1 with the thermoplastic closure system attached to a rigid neck 2 and closing off a mouth of the container. Hanger 4 supports the container in an inverted position when administering liquid.

The closure system comprises an inner closure 10 and an outer closure 30 with skirts 11 and 31, respectively, which are permanently bonded or fused by spin welding to a flange 7 of container 1. The thermoplastic inner closure 10 and thermoplastic container form a hermetically sealed vessel containing parenteral liquid therein. Outer closure 30 keeps inner closure 10 sterile and an upper portion of this outer closure 30 is removed immediately before connecting an administration set to inner closure 10.

Figure 5:
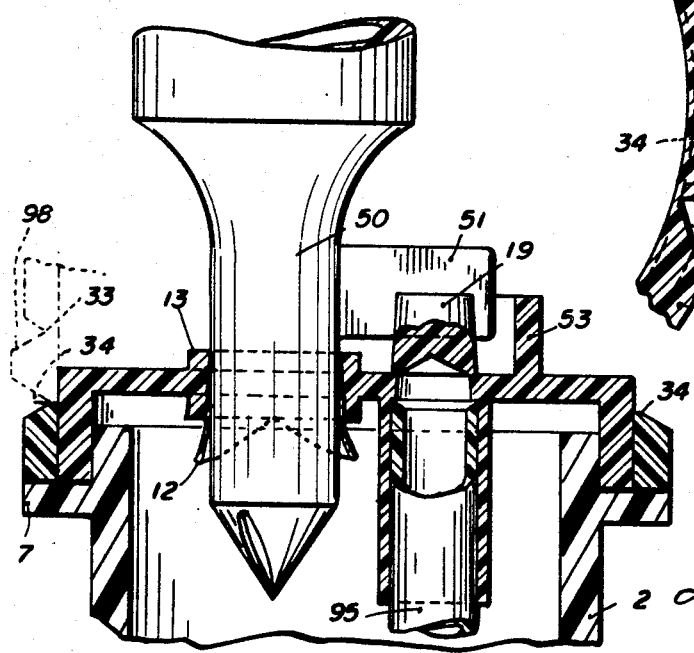
FIGURE 5 is an enlarged sectional view of the thermoplastic container with a second embodiment of the inner closure showing means for opening an air inlet port.

The inner closure 10 is shown in two embodiments in FIGURES 2 and 5, respectively. In FIGURE 2 an air entrance port is closed off by a pierceable nonresealable diaphragm 15. When connecting an administration set after removing an upper portion of outer closure 30, the operator pokes a tip of the administration set's spike through diaphragm 15, opening up the air entrance port. Next, he shoves the spike through pierceable diaphragm 12 surrounded by tubular spike gripping means 13.

In the second embodiment of the inner closure (see FIGURE 5) the air entrance port is closed by a frangible tab 19. Here the operator inserts a spike 50 of an administration set through diaphragm 12. He then twists the administration set, and a lateral protrusion 51 on the administration set breaks off frangible tab 19 opening up the air entrance port. A guard 53 protects tab 19 from being accidentally broken off.

In both embodiments, air enters through an air entrance port connected to a long air tube 95. Air tube 95 can have a float valve 21 at its inner end to prevent liquid from running out this air tube when container 1 is inverted. This valve is described in an application entitled "Parenteral Liquid Container With Air Tube" filed June 13, 1966, Serial No. 557,238, invented by David A. Jellies.

The outer thermoplastic closure 30 protecting inner closure 10 has a unique construction. Closure 30 with skirt 31 attached to top wall 39 has a lower portion permanently bonded to flange 7. An upper portion of closure 10 is separated from the lower portion by two parallel grooves 33 and 34 peripherally about this skirt, defining a tear strip 98 therebetween. A vertical groove 37 (see FIGURES 4 and 4A) extends transversely across tear strip 98 between the two peripheral grooves 33 and 34. No portion of the vertical groove or the peripheral grooves 33 and 34 extend completely through skirt 31. Thus, an entire inner surface of outer closure 30 remains closed off from an outer nonsterile surface thereof.

Figure 4A:
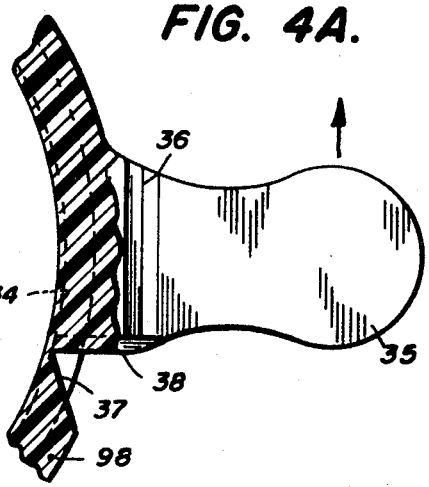
FIGURE 4A is a sectional view taken along line 4A—4A of FIGURE 4.

To open outer closure 30, handle means 35 is cocked to the right in FIGURE 4. This causes tearing forces to be concentrated along a sharp edged rib 38 connected to material in vertical groove 37. An initial break is made at the base of vertical groove 37 and the tear strip peeled off to remove upper portion of outer closure 30.

With the above handle structure a person may sometimes inadvertently break the tear strip at vertical groove 37 if he grabs the container at its neck and exerts an upward pressure on handle means 35. To eliminate this possibility, a weakened lateral area 36 in handle means 35 permits the handle means to hinge upwardly or downwardly without breaking tear strip 98.

In the above specification we have used specific embodiments to describe our invention. It is understood that those persons skilled in the art can make certain modifications to these embodiments without departing from the spirit and scope of our invention.

We claim:

1. Apparatus for storing and handling parenteral liquids comprising: a thermoplastic container having an upstanding rigid neck defining a mouth; a transverse thermoplastic inner closure closing said mouth and permanently bonded to said rigid neck; said thermoplastic container and thermoplastic inner closure presenting a hermetically sealed thermoplastic vessel for parenteral liquids; a pierceable diaphragm integral with said inner closure through which entrance into the system may be gained; an outer thermoplastic closure having a lower portion permanently bonded to said thermoplastic vessel and having an upper portion encasing and maintaining said inner closure sterile; a pair of parallel peripheral grooves about the outer closure defining a tear strip which separates said upper and lower portions; said tear strip having a vertical groove thereacross between the two peripheral grooves; said outer closure having its inner and outer surfaces separated by thermoplastic material along the entire lengths of the two peripheral grooves and the vertical groope; and handle means attached to the tear strip for breaking the tear strip at the vertical groove to initiate tearing of said tear strip along the peripheral grooves.

2. Apparatus for storing and handling parenteral liquids as set forth in claim 1 wherein the inner thermoplastic closure has an air entrance port closed off by a frangible tab.

3. Apparatus for storing and handling parenteral liquids as set forth in claim 1 wherein the inner thermoplastic closure has an air entrance port closed off by a pierceable nonresealable diaphragm.

4. Apparatus for storing and handling parenteral liquids as set forth in claim 1 wherein the handle means has a lateral weakened area whereby the handle means can be bent upwardly without breaking the tear strip at the vertical groove.

5. Apparatus for storing and handling parenteral liquids as set forth in claim 1 wherein the inner closure has a transverse wall having a lateral area, and said pierceable diaphragm integral with said transverse wall having a lateral area substantially less than the total lateral area of said transverse wall, said pierceable diaphragm being thinner than portions of the transverse wall adjacent the pierceable diaphragm.

6. Apparatus for storing and handling parenteral liquids as set forth in claim 5 wherein the transverse wall has an integral sleeve surrounding the pierceable diaphragm, said sleeve adapted to make a liquid-tight seal with an administration set spike shoved through the pierceable diaphragm.

7. Apparatus for storing and handling parenteral liquids as set forth in claim 1 wherein the inner closure has an air tube connected thereto which extends into the thermoplastic container.

8. A parenteral liquid container having across a mouth thereof a thermoplastic closure comprising: a top wall; a downwardly projecting skirt integral with said top wall; said skirt having a pair of parallel peripheral grooves defining therebetween a tear strip for separating an upper and a lower portion of the closure; said tear strip having a vertical groove extending between the two parallel peripheral grooves; said closure having its inner and outer surfaces completely separated by thermoplastic material along the entire lengths of the two peripheral grooves and the vertical groove; and means attached to the tear strip for breaking the tear strip at the vertical groove, said means including a thermoplastic handle integral with said tear strip with this handle having a sharp-edged rib joined to the thermoplastic material within said vertical groove.

9. A method of opening parenteral fluid storing and handling apparatus having a thermoplastic closure means with a liquid outlet closed by a pierceable diaphragm and an air entrance port with a frangible tab extending outwardly therefrom, said method including the steps of: piercing the diaphragm with a spike of an administration set, which administration set has a lateral protrusion thereon; and rotating said administration set about a longitudinal axis of said spike until said lateral protrusion breaks off said frangible tab, thereby opening said air entrance port of the inner closing means.

10. A method of opening parenteral fluid storing and handling apparatus having a thermoplastic inner closure means with a liquid outlet including a pierceable diaphragm and an air entrance port with a frangible tab extending outwardly therefrom and having a thermoplastic outer closure means with a tear strip, said method including: tearing off said tear strip and removing at least a portion of said outer closure means to expose the inner closure means; piercing the diaphragm with a spike of an administration set, which administration set has a lateral protrusion thereon; rotating said administration set about a longitudinal axis of said spike until said lateral protrusion breaks off said frangible tab, thereby opening said air entrance port of the inner closing means.

11. Apparatus for storing and handling parenteral liquids comprising: a thermoplastic container for containing a parenteral liquid having a rigid neck defining a mouth; a thermoplastic inner closure including a portion extending transversely across said mouth and including a pierceable diaphragm portion relatively thinner and smaller in area than the remaining portion of said inner closure extending across said mouth, which diaphragm portion is for receiving a rupturing spike therethrough; a thermoplastic outer closure including a top wall overlying said inner closure, said inner and outer closure including portions integrally bonded to said container, hermetically sealing said container and its contents and neck, said outer closure maintaining the sterile integrity of said pierceable diaphgram of said inner closure, said outer closure including a tear strip portion below said top wall including means for initiating rupture of said tear strip whereby said tear strip, portions thereabove, and top wall can be removed to afford access to said pierceable diaphragm and permit removal of the sealed contents of said container.

12. The structure as claimed in claim 11 which includes a portion surrounding said pierceable diaphragm for sealingly engaging a rupturing spike as it ruptures said diaphragm.

13. The structure as claimed in claim 12 in which said portion surrounding said diaphragm portion surrounding said pierceable diaphragm comprises a collar peripherally surrounding said diaphragm and projecting out of the general plane of the inner closure.

14. The structure as claimed in claim 11 in which said neck includes a peripheral flange extending from the outer surface thereof and below said mouth, said inner and outer closures including depending skirts disposed in circumposed relation, the lower edges of said skirts engaging said flange on the container neck and being integrally bonded thereto.

15. The structure as claimed in claim 14 in which said tear strip is circumposed about an intermediate portion of the outer closure skirt.

16. Apparatus for storing and handling parenteral liquids comprising: a thermoplastic container for containing a parenteral liquid having a rigid neck defining a mouth; a thermoplastic inner closure including a portion extending transversely across said mouth and including a pierceable diaphragm portion relatively thinner and smaller in area than the remaining portion of said inner closure extending across said mouth, which diaphragm is for receiving a rupturing spike therethrough, said thermoplastic inner closure permanently and integrally fused to the thermoplastic container to form a bacteria-tight waterproof thermoplastic vessel; a thermoplastic outer closure including a top wall overlying said inner closure, said outer closure having a lower portion permanently and integrally fused to the thermoplastic vessel to form a bacteria-tight waterpoof chamber protecting the inner closure's tranversely extending portion, whereby with both inner and outer closures permanently fused in this structural configuration, the apparatus may be emersed in a steam or hot water media for sterilization after said vessel is filled with parenteral liquid without getting any of the sterilizing media inside either the inner or outer closure; said outer closure including a tear strip portion below said top wall including means for initiating rupture of the tear strip, whereby said tear strip, portions thereabove, and the top wall can be readily removed to afford access to said pierceable diaphragm and permit removal of the sealed contents of said container; said tear strip portion having its inner surface spaced from the thermoplastic vessel prior to rupture, thus insuring that the tear strip itself will not become fused to the vessel when the lower portion of the outer closure is fused to the vessel.

17. The structure as claimed in claim 16 in which the outer closure is permanently and integrally fused to the inner closure.

18. The structure as claimed in claim 16 in which the outer closure is permanently and integrally fused to the thermoplastic container.

19. The structure as claimed in claim 16 in which the inner closure is permanently and integrally fused by spin welding to the container to form the sealed vessel, and in which the outer closure is also permanently and integrally fused by spin welding to the sealed thermoplastic vessel.

20. The structure as claimed in claim 16 in which the inner closure, the outer closure, and the container are all of the same thermoplastic material to create a homogeneous permanent fusion bond between the elements.

21. The structure as claimed in claim 16 in which the transversely extending mouth closing portion of the inner closure has a frangible second diaphragm and an attached air tube extending into the container, said air tube having a longitudinal passage aligned with said second diaphragm.

22. Apparatus for storing and handling parenteral liquids comprising: a thermoplastic container for containing a parenteral liquid having a rigid neck defining a mouth, a thermoplastic inner closure including a transverse wall portion extending across said mouth and including an opening in the transverse wall, which opening is smaller in area than the transverse wall; removable means sealing said opening, said opening adapted for connection to a liquid administration set upon removal of said sealing means; said inner closure being permanently and integrally fused to the thermoplastic container to form a bacteria-tight waterproof thermoplastic vessel; a thermoplastic outer closure including a top wall overlying said inner closure, said outer closure having a lower portion permanently and integrally fused to the thermoplastic vessel to form a bacteria-tight waterproof chamber protecting the inner closure's transversely extending portion, whereby with both the inner and outer closures permanently fused in this structural configuration the apparatus may be immersed in a steam or hot water media for sterilization after said vessel is filled with parenteral liquid without getting any of the sterilizing media inside either the inner or outer closure; said outer closure including a tear strip portion below said top wall including means for initiating rupture of the tear strip, whereby said tear strip, portions thereabove and the top wall can be readily removed to afford access to said sealing means and permit removal of the sealed contents of said container; said tear strip portion having its inner surface spaced from the thermoplastic vessel prior to rupture, thus insuring that the tear strip itself will not become fused to the vessel when the lower portion of the outer closure is fused to the vessel.

References Cited

UNITED STATES PATENTS

| | | | |
|---|---|---|---|
| 2,231,418 | 2/1941 | Trotter | 128—214 |
| 3,001,525 | 9/1961 | Hendricks | 128—214 |
| 3,142,402 | 7/1964 | Fox | 215—41 |
| 3,142,403 | 7/1964 | Fox | 215—41 |
| 3,235,117 | 2/1966 | Mason | 215—46 X |

FOREIGN PATENTS 1,247,480   10/1960   France.

JOSEPH R. LECLAIR, *Primary Examiner.*

R. PESHOCK, *Assistant Examiner.*